United States Patent Office 3,450,640
Patented June 17, 1969

3,450,640
PREPARATION OF BARIUM-137 IN AN
ORGANIC MEDIUM
André Bonnin, Courbevoie, and Philippe Poirier, Garges-
les-Gonesse, France, assignors to Societe Saint-Gobain
Techniques Nouvelles, Courbevoie, France
Filed Dec. 13, 1966, Ser. No. 601,384
Claims priority, application France, Dec. 23, 1965,
43,602
Int. Cl. C01f *11/00;* B01d *59/30*
U.S. Cl. 252—301.1         4 Claims

ABSTRACT OF THE DISCLOSURE

Barium-137 is obtained from caesium-137 fixed on an ion exchange resin. The caesium-137 fixed on the ion exchange resin is contacted with a buffered aqueous phase and the resin is then eluted with an organic phase. The barium-137 is extracted from the aqueous phase film on the resin.

---

Figure 1:
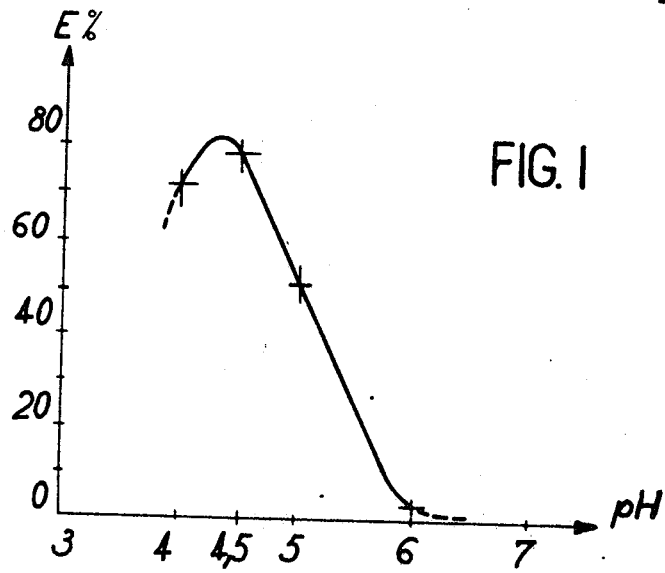

This invention relates to a method of preparation of barium-137 in an organic medium starting from caesium-137.

In the field of medicine, there are a number of potential applications for which barium-137 is of special interest by virtue of its short half-life. In particular, barium-137 can be injected in the human body and makes it possible by emission of gamma rays to measure the rate of circulation of the blood in vivo.

In industrial fields also, barium-137 can be put to many different uses such as, for example, leak detection, studies involving the flow motion of fluids, or the measurement of flow rates.

In some industrial applications such as hydraulic measurements in petroleum products, it may prove an advantage to obtain barium-137 in an organic phase.

The method according to the invention consists, after fixing caesium-137 on an ion-exchange resin, in contacting said resin with an aqueous phase to which a buffer solution has been added, then in eluting said resin with an organic phase which is capable of extracting barium-137 from the aqueous phase, equilibrium having been established between the organic phase and the aqueous phase prior to passing said organic phase through the resin until the pH value of said aqueous phase is maintained within a predetermined range.

The fixation of caesium-137 on the resin can be performed in the manner described in French Patent No 1,392,606 entitled, "Method of Preparation of Barium-137" as filed in the name of the present applicant on Nov. 8, 1963, and as described in the first certificate of addition thereto.

The extraction agents which are best suited for the execution of the invention are constituted by β-diketones such as thenyltrifluoroacetone (TTA) and organophosphorus compounds. For example, use is made of di-2-ethyl-hexylphosphoric acid (D2EHPA) which is soluble in hydrocarbons.

Di-2-ethyl-hexyl-phosphoric acid has the property of exchanging one proton for some cations such as barium and forming the corresponding salt, thus permitting the extraction of these metals in organic phase according to the reaction:

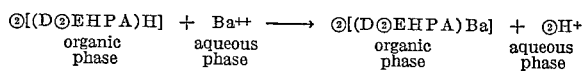

It is apparent from this equilibrium that the extraction of barium in organic phase by diethyl-hexylphosphoric acid results in acidification of the equeous phase. In order that the extraction of barium-137 should be performed with high yields, it is essential to ensure that the pH value of the aqueous phase is maintained within a predetermined range.

The influence of the pH value on the extraction yields can be demonstrated as follows: 25 ml. of an aqueous phase consisting of a 2 M sodium nitrate solution containing barium-137 and the acetic acid-sodium acetate buffer solution is contacted with 25 ml. of an organic phase containing 1 volume of diethyl-hexyl-phosphoric acid for 9 volumes of dodecane. Extraction operations are performed by varying the pH values, the extraction yields obtained being recorded in the following table:

| pH— | Percent E |
|---|---|
| 6 | 3.1 |
| 5 | 50 |
| 4.5 | 78.3 |
| 4 | 70.7 |

In FIG. 1 of the accompanying drawings, the pH values are plotted as abscissae and the extraction yields are plotted as ordinates. It can be visualized that the pH value must be between 4 and 4.5 in order to obtain high extraction yields.

The present invention proposes a method of extraction of barium-137 in organic phase in which the liquid-liquid extraction can be carried out directly in the resin column on which the caesium-137 has been fixed.

When the ion-exchange resin is contacted with an aqueous phase then centrifugalized but not dried, the grains remain covered with a thin film of water. If these grains are then contacted with an organic solvent which is immiscible with water, the thin film of water accordingly remains. If barium-137 is present in this thin aqueous-phase layer and if the organic phase consists of a diethylhexyl-phosphoric acid solution diluted in an organic solvent such as dodecane, it will be possible to extract the barium in organic phase provided that the pH conditions are satisfied.

In order to apply the method according to the invention, the resin column is formed in an aqueous medium and the aqueous phase is then directly replaced by the organic phase. This operation can be performed under gravity by feeding the organic solvent into the top of the column. Should the density of the organic solvent be higher than that of the aqueous phase, the organic solvent would accordingly be introduced into the base of the column. The substitution of one phase for the other can be facilitated by adding a small quantity of non-ionic surfactant, or wetting agent, to the aqueous phase.

As has been pointed out, the adjustment of the pH value of the aqueous phase assumes very great importance if it is desired to obtain high extraction yields. It is therefore necessary to limit variations in the pH value of the aqueous phase and to maintain this value if possible within the range of 4 to 4.5.

According to one important feature of the method, equilibrium of the organic phase with the aqueous phase is established prior to passing the organic phase through the resin. The pH value of the aqueous phase is reduced as a result of the extraction of Na+ ions. The operation is repeated with further fractions of aqueous phase until the pH value of this latter is maintained within the selected range. This process can advantageously be carried out continuously in a bank of mixer-settlers. The organic phase finally discharged is usually in a turbid state, and is clarified by an addition of TBP (tributyl-phosphate), thereby assisting solubilization of the sodium salt of the diethyl-hexyl-phosphoric acid.

A buffer solution which advantageously consists of citric acid and disodium hydrogen phosphate is also added to the aqueous phase.

The possibility of performing the liquid-liquid extraction from the resin column also permits the use of the same mechanical system either in organic phase or in aqueous phase. The method according to the invention can advantageously be carried into practice by means of the arrangement disclosed in French Patent No. 143,272 entitled "Device for the Production of Radioelements" as filed in the name of the present applicant on Feb. 10, 1965.

There will now be given below a number of examples illustrating the extraction of barium-137 by an organic solution from a resin column in which caesium-137 has been fixed.

Example 1 describes an elution in aqueous medium and an elution in organic medium which are carried out in a same column.

Example 2 relates to a study of variations in elution yield as a function of the number of elutions performed in a same column.

Example 3 records the results of a study of eluted activity due to fractionation of the eluate.

In all of these examples, the aqueous phase and organic phase had the following compositions.

Aqueous phase, solution I:
  2 M $NaNO_3$
  $10^{-3}$ M Cemulsol K
  0.05 M citric acid
  0.1 M $Na_2HPO_4$ Organic phase previously put in equilibrium with the organic phase, solution II:
  D2EHPA (1 vol.)
  TBP (1 vol.)
  dodecane (8 vol.)

It will be recalled that the efficiency of a generator is characterized by the ratio:

$$E = A°/A_f$$

wherein $A_f$ designates the activity which is fixed on the resin and $A°$ designates the total initial activity of the amount withdrawn as related to the beginning of the elution. This convention may result in values $A°$ which are higher than $A_f$, especially in the event of prolonged elution.

The contamination is characterized by the ratio:

$$C = A_r/A°$$

wherein $A_r$ is the residual activity of the eluate as measured after a period of time which is sufficient to ensure that all of the barium has distintegrated. This residual activity is due to caesium contamination of the eluate.

EXAMPLE 1

An activity of $1.3 \cdot 10^{-2}$ mc. of caesium, namely $1.44 \cdot 10^6$ pulses per minute, was fixed on a column 4 centimeters in height and 1.6 square centimeters in cross-sectional area containing 4 ml. of resin (Amberlyst A27) loaded with ferrocyanide of copper.

Three elutions were performed in aqueous medium:

| Elution times | Volume eluted in ml. | A° pulses/minute |
| --- | --- | --- |
| 2 minutes 20 | 10 | $1.6 \cdot 10^6$ |
| 4 minutes 30 | 10 | $2.1 \cdot 10^6$ |
| 5 minutes 50 | 10 | $3 \cdot 10^6$ | and three elutions in organic medium

| Elution times | Volume eluted | A° pulses/minute |
| --- | --- | --- |
| 7 minutes 47 | 10 | $4.46 \cdot 10^6$ |
| 2 minutes 14 | 5 | $2.46 \cdot 10^6$ |
| 2 minutes 45 | 5 | $2.95 \cdot 10^6$ |

The operation which takes place in organic medium is exactly in accordance with expectations.

EXAMPLE 2

An activity of 0.9 mc. of caesium, namely $10^8$ pulses/minute, was fixed on a resin column having a height of 4 cm., a cross-sectional area of 1.6 cm.$^2$ and containing 6.4 ml. of resin. Two elutions of 15 ml. in 3 minutes were effected by solution I having a pH value of 4.4.

$A°_1 = 1.43 \cdot 10^8$ pulses/minute, c. $= 1.8 \cdot 10^{-6}$
$A°_2 = 1.27 \cdot 10^8$ pulses/minute, c. $= 1.6 \cdot 10^{-6}$ Four liters of organic phase II were saturated with solution I by means of a flat mixer-settler with eight extraction stages. Two elutions of 15 ml. in three minutes gave the following results:

$A°_1 = 1.53 \cdot 10^8$, c. $= 4.7 \cdot 10^{-6}$
$A°_2 = 1.60 \cdot 10^8$, c. $= 2.9 \cdot 10^{-6}$ At this stage, 100 ml. of organic phase had passed through the extraction column.

Elution was then performed with 3300 ml. of organic phase by means of a pump at a constant rate of 300 ml./h. A withdrawal of 15 ml. was effected every 300 ml. for a period of 3 minutes. The decay of Ba was followed by means of a counter, and the results recorded were as follows:

| No. | Volume, ml. | A° $10^8$ pulses/min. | Residual activity $A_r$ | C $10^6$ | Remarks |
| --- | --- | --- | --- | --- | --- |
| 1 | | 1.53 | 48 | 4.7 | |
| 2 | 100 | 1.60 | 31 | 2.9 | |
| 3 | 400 | 1.60 | 317 | 20 | 48 hrs. contacting time. |
| 4 | 700 | 1.84 | 65 | 5.3 | |
| 5 | 1,000 | 1.60 | 31 | 2.9 | |
| 6 | 1,300 | 1.60 | 21 | 1.9 | |
| 7 | 1,600 | 1.43 | 130 | 13.6 | 17 hrs. contacting time. |
| 8 | 1,900 | 1.53 | 48 | 4.7 | |
| 9 | 2,200 | 1.60 | 29 | 2.7 | |
| 10 | 2,500 | 1.34 | 13 | 1.4 | |
| 11 | 2,800 | 1.34 | 3 | 0.34 | |
| 12 | 3,100 | 1.28 | 14 | 1.6 | |
| 13 | 3,400 | 1.28 | 18 | 2.1 | |

It may be concluded from the above results that the extraction column continues to operate under good conditions after the transfer of 3400 ml. of solvent, namely 530 volumes of bed or 227 withdrawals of 15 ml. It is observed that a long contacting time increases the contamination.

EXAMPLE 3

A withdrawal of 16 ml. at a rate of 300 ml./h. was carried out in a column in accordance with Example 2. The product withdrawn was collected in fraction of 1 to 3 ml.

A sample of 1 ml. was taken from each fraction to follow its rate of decay.

Results were interpreted in two ways:

by taking as initial instant of each fraction the initial instant T° of the withdrawal (usual method of calculation), by taking as initial instant T° of each fraction the initial instant T° as displaced from the time taken by the previous fractions to flow out.

[(1°) T° non-corrected]

| No. | Log. $A°_1$ ml. | $V_p$ | $E_p$ | $\Sigma V_p$ | $\Sigma E$ |
| --- | --- | --- | --- | --- | --- |
| 1 | 4.05 | 2 | 0.2 | 2 | 0.2 |
| 2 | 6.83 | 2 | 13.5 | 4 | 13.7 |
| 3 | 6.96 | 2 | 18.2 | 6 | 31.9 |
| 4 | 6.87 | 1 | 7.4 | 7 | 39.3 |
| 5 | 6.83 | 3 | 20.2 | 10 | 59.6 |
| 6 | 6.86 | 2 | 14.5 | 12 | 74.2 |
| 7 | 6.83 | 2 | 13.5 | 14 | 87.7 |
| 8 | 6.86 | 2 | 13.5 | 16 | 102 |

$V_p$ = Volume of each fraction.
$A°_1$ ml. = initial activity of each sample of 1 ml.
$E_p$ = elution of each fraction.

[(2°) T° corrected]

| No. | Log. A°₁ ml. | V_p | E_p | ΣV_p | ΣE |
|---|---|---|---|---|---|
| 1 | 4.05 | 2 | 0.2 | 2 | 0.2 |
| 2 | 6.79 | 2 | 12.3 | 4 | 12.6 |
| 3 | 6.84 | 2 | 14.8 | 6 | 27.4 |
| 4 | 6.74 | 1 | 5.5 | 7 | 32.9 |
| 5 | 6.67 | 3 | 14 | 10 | 46.9 |
| 6 | 6.63 | 2 | 8.5 | 12 | 55.4 |
| 7 | 6.56 | 2 | 7.3 | 14 | 62.7 |
| 8 | 6.54 | 2 | 6.9 | 16 | 69.6 |

The first mode of calculation gives a yield of 102%, whilst the second method gives a yield of 69.6%.

Figure 2:
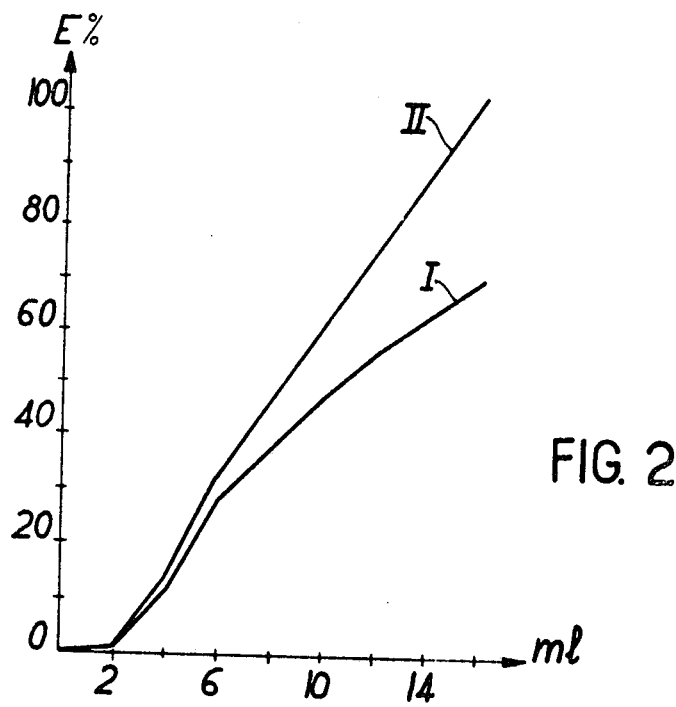

FIG. 2 shows the elution yields as a function of the volume of eluate when T° is corrected (curve I) and when T° is non-corrected (curve II).

Figure 3:
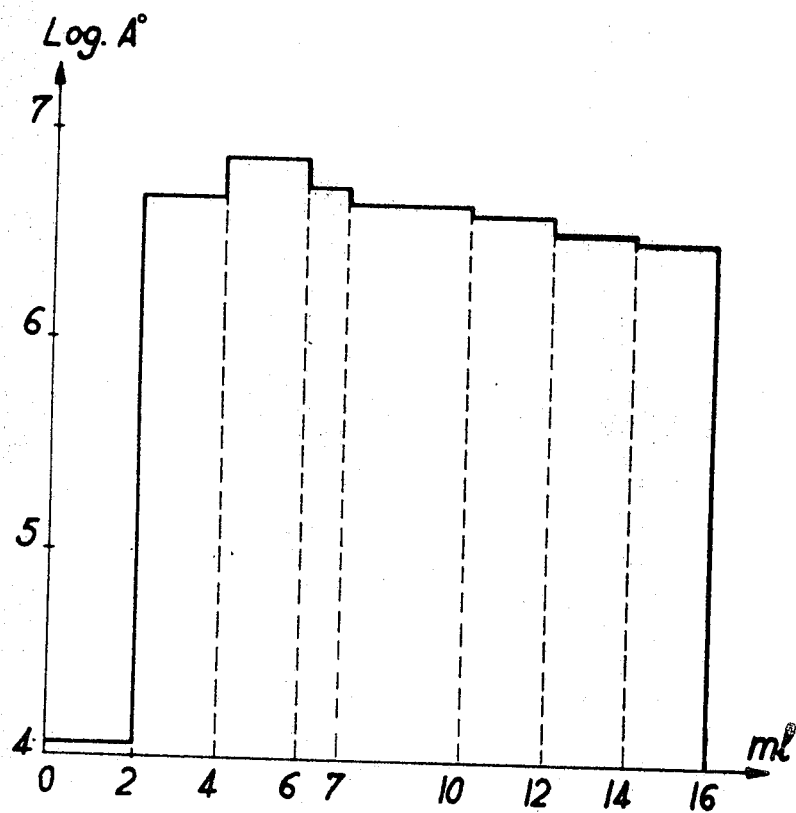

There are shown in FIG. 3 the variations in activity as a function of the volume of eluate for T°-corrected. The volume of eluate is plotted as abscissae, and the logarithm of activity is plotted as ordinates.

It can be observed that, after elution of 16 ml. of organic phase, the level stage or plateau which would correspond to continuous operation of the extraction column has not yet been reached.

Compared with a column which operates in aqueous phase alone, the liquid-liquid extraction tends to spread the fall-off from the activity peak. As a consequence, the extraction yield is lower at equal volume in the zone of low elution volumes, although the extent of this occurrence does not in any way affect the practical advantage of the system.

What we claim is:

1. In a process for preparing barium-137, the steps of fixing caesium-137 on an ion exchange resin, then contacting the resin with a buffered aqueous phase thus forming a thin aqueous film containing barium-137 and then eluting the resin with an organic phase selected from the group consisting of thenyltrifluoroacetone and di-2-ethylhexyl-phosphoric acid, to extract barium-137 from the aqueous phase film on the resin equilibrium having been established between the organic phase and the aqueous phase prior to passing said organic phase through the resin until the aqueous phase has a pH value of 4–4.5.

2. The process as described in claim 1, the aqueous phase being a solution of an alkaline-earth salt.

3. The process as described in claim 1, the aqueous phase being a sodium salt solution.

4. The process as described in claim 1, the aqueous solution being buffered by citric acid and disodium hydrogen phosphate.

References Cited

UNITED STATES PATENTS 3,154,500  10/1964  Jansen et al. _____ 252—301.1
3,326,811   6/1967  Healy _____ 252—301.1
3,345,305  10/1967  Bonnin et al. _____ 252—301.1

LELAND A. SEBASTIAN, *Primary Examiner.*

S. J. LECHERT, *Assistant Examiner.*

U.S. Cl. X.R.

23—311, 312